United States Patent
Hama (10) Patent No.: US 9,716,808 B2
(45) Date of Patent: Jul. 25, 2017

(54) IMAGE COMMUNICATING APPARATUS, CONTROL METHOD THEREFOR, AND STORAGE MEDIUM STORING PROGRAM

(71) Applicant: CANON KABUSHIKI KAISHA, Tokyo (JP)

(72) Inventor: Mikio Hama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 14/627,115

(22) Filed: Feb. 20, 2015

(65) Prior Publication Data

US 2015/0256710 A1    Sep. 10, 2015

(30) Foreign Application Priority Data

Mar. 4, 2014    (JP) .................................. 2014-041940

(51) Int. Cl.
*H04M 11/00*    (2006.01)
*H04N 1/327*    (2006.01)

(52) U.S. Cl.
CPC ..... *H04N 1/32719* (2013.01); *H04N 1/32704* (2013.01); *H04N 1/32708* (2013.01)

(58) Field of Classification Search
CPC .................................................. H04N 1/32719
See application file for complete search history.

(56) References Cited

U.S. PATENT DOCUMENTS

| 6,266,159 B1 * | 7/2001 | Otsuka | H04N 1/32037 |
| | | | 358/405 |
| 2013/0216031 A1 * | 8/2013 | Naito | H04M 11/066 |
| | | | 379/100.01 |
| 2015/0256710 A1 * | 9/2015 | Hama | H04N 1/32719 |
| | | | 358/443 |

FOREIGN PATENT DOCUMENTS

JP    9-252364 A    9/1997

* cited by examiner

*Primary Examiner* — Joseph T Phan
(74) *Attorney, Agent, or Firm* — Fitzpatrick, Cella, Harper & Scinto

(57) ABSTRACT

There is provided an image communicating apparatus which is capable of performing a deemed voice communication, and includes a telephone control unit configured to control communication by connecting a telephone, and a modem configured to control FAX communication by the deemed voice communication. In the image communicating apparatus, communication is controlled so that a detection unit configured to perform detection processing of detecting facsimile reception by software performs the detection processing during a period in which the modem cannot detect the facsimile reception.

15 Claims, 7 Drawing Sheets

IMAGE COMMUNICATING APPARATUS, CONTROL METHOD THEREFOR, AND STORAGE MEDIUM STORING PROGRAM

BACKGROUND OF THE INVENTION

Field of the Invention

The present invention relates to an image communicating apparatus, a control method therefor, and a storage medium storing a program.

Description of the Related Art

In conventional facsimile (FAX) transmission/reception, digital image data is modulated into an analog signal by a modem, and transmitted via a PSTN (Public Switched Telephone Network), and an analog signal received from the PSTN is demodulated into digital data, and then received.

To the contrary, in recent years, FAX transmission using a high-speed network such as an IP network is becoming widespread. There are two methods for FAX transmission using the IP network. One of the methods is a transmission method called T.38 of ITU-T recommendation, in which a digital signal transmitted according to the T.30 protocol is transmitted intact, and which can implement high-speed transmission, as compared with T.30. The other method is deemed voice transmission using the T.30 protocol of ITU-T recommendation. This method is a method of performing transmission by modulating data into an analog signal by a modem, encoding it by a voice codec, and adding an IP header to form the encoded signal into an RTP packet. This method is called deemed voice transmission since a T.30 analog signal is transmitted by deeming it a voice signal.

In the conventional FAX transmission/reception, since a modem modulates a digital signal as transmission data into an analog signal, and demodulates an analog signal as reception data into a digital signal, a data I/F between the modem and a line is an analog I/F. In deemed voice transmission, however, a digital signal as transmission data is modulated into an analog signal, and formed into a voice packet by a voice codec. Alternatively, since it is necessary to decode a voice packet as reception data by a voice codec, and demodulate the decoded data into a digital signal, a digital modem which incorporates a voice codec and can input/output a digital signal is used. Note that ITU-T recommendation G.711 is used as a voice packet encoding method and RTP (Real Time Protocol) is used as a transmission protocol. The above-described two methods implement Point-to-Point transmission on the IP network using SIP (Session Initiation Protocol) as a call control unit. Examples of the IP network are a digital public network called an NGN (Next Generation Network) provided by NTT, and a private IP line using an IP private branch exchange (IP-PBX) or the like. Especially in the case of the NGN network, for example, the bandwidth is guaranteed and the security is managed, thereby allowing high-speed secure image transmission. Although the transmission rate of the conventional PSTN is at most 33.6 Kbps, the NGN guarantees a transmission rate of at most 1 Mbps, thereby allowing transmission at a transmission rate about 30 times higher than that of the PSTN.

On the other hand, an IP phone is a technique of implementing voice communication by encoding a voice into PCM data, and transmitting/receiving it on the IP network. Using this technique can implement voice communication by the handset/slave (to be referred to as a handset hereinafter) of a FAX. An SLIC (Subscriber Line Interface Circuit) for connecting a telephone and the IP network is used to connect the handset to the IP network. The main application purpose of the SLIC is encoding of an analog voice into a voice packet, detection of a hooking operation of the telephone, identification of a dial signal from the telephone and the like, ringing control of the telephone, and the like.

By setting a mode, a conventional facsimile apparatus connected to an analog network has a function (FAX/TEL switching) of automatically switching between a telephone and a FAX or a function (message recording/TEL switching) of automatically switching between a message recording device and a FAX.

In FAX/TEL switching, when the FAX receives a calling signal from an exchange a predetermined number of times, it terminates a call, and the FAX sends a pseudo ringback tone (pseudo RBT) imitating a ringback tone while calling a slave connected to itself. Alternatively, the FAX sends a message (OGM) like "Now calling. Please hold on. Please send in the case of a facsimile." If a CNG signal (a 1100-Hz tone) from a transmitter is detected during this time, FAX reception starts. If no CNG signal can be detected, the FAX continues calling the slave. When the slave is hooked up, voice communication using the telephone starts.

The modem performs all of such sending of a pseudo RBT signal or OGM signal and detection of a CNG signal. Since, however, the modem can perform only one process at once, it cannot detect a CNG signal while sending an OGM signal or pseudo RBT signal.

Conventionally, a silence period of several sec during which neither a pseudo RBT signal nor an OGM signal is sent is provided after a receiver terminates a call. An attempt is made to detect a CNG signal from a transmitter during the silence period, and a CNG signal is detected during the regular silence periods at the time of sending of a pseudo RBT. For example, Japanese Patent Laid-Open No. 9-252364 describes a technique of detecting a CNG signal by causing an analog signal to pass through an RBT block filter. If, however, a CNG signal is received during a period other than the silence period, the CNG signal cannot be detected, and is missed in some cases.

An deemed voice IP FAX connected to the IP network has the same problem, and it is impossible to detect a CNG signal while sending a pseudo RBT signal or OGM signal by a digital modem. If a CNG signal is received but cannot be detected, a slave rings before a transmitter transmits a CNG signal next time, and the user off-hooks the slave. This disables FAX reception. In addition, during the silence period of several sec in which neither a pseudo RBT signal nor an OGM signal is sent, a sender becomes suspicious and disconnects a call.

SUMMARY OF THE INVENTION

An aspect of the present invention is to eliminate the above-mentioned problems with the conventional technology.

The present invention provides a technique capable of transiting to facsimile reception processing even if a modem cannot detect facsimile reception.

The present invention in one aspect provides an image communicating apparatus capable of performing a deemed voice communication, comprising: a telephone control unit configured to control communication by connecting a telephone; a modem configured to control FAX communication by the deemed voice communication; a detection unit configured to perform detection processing of detecting facsimile reception by software; and a control unit configured to control communication so that the detection unit performs the detection processing during a period in which the modem cannot detect the facsimile reception.

According to the present invention, even if a modem cannot detect facsimile reception, it is possible to transit to facsimile reception processing.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same components and a description thereof will be omitted.

Figure 1:
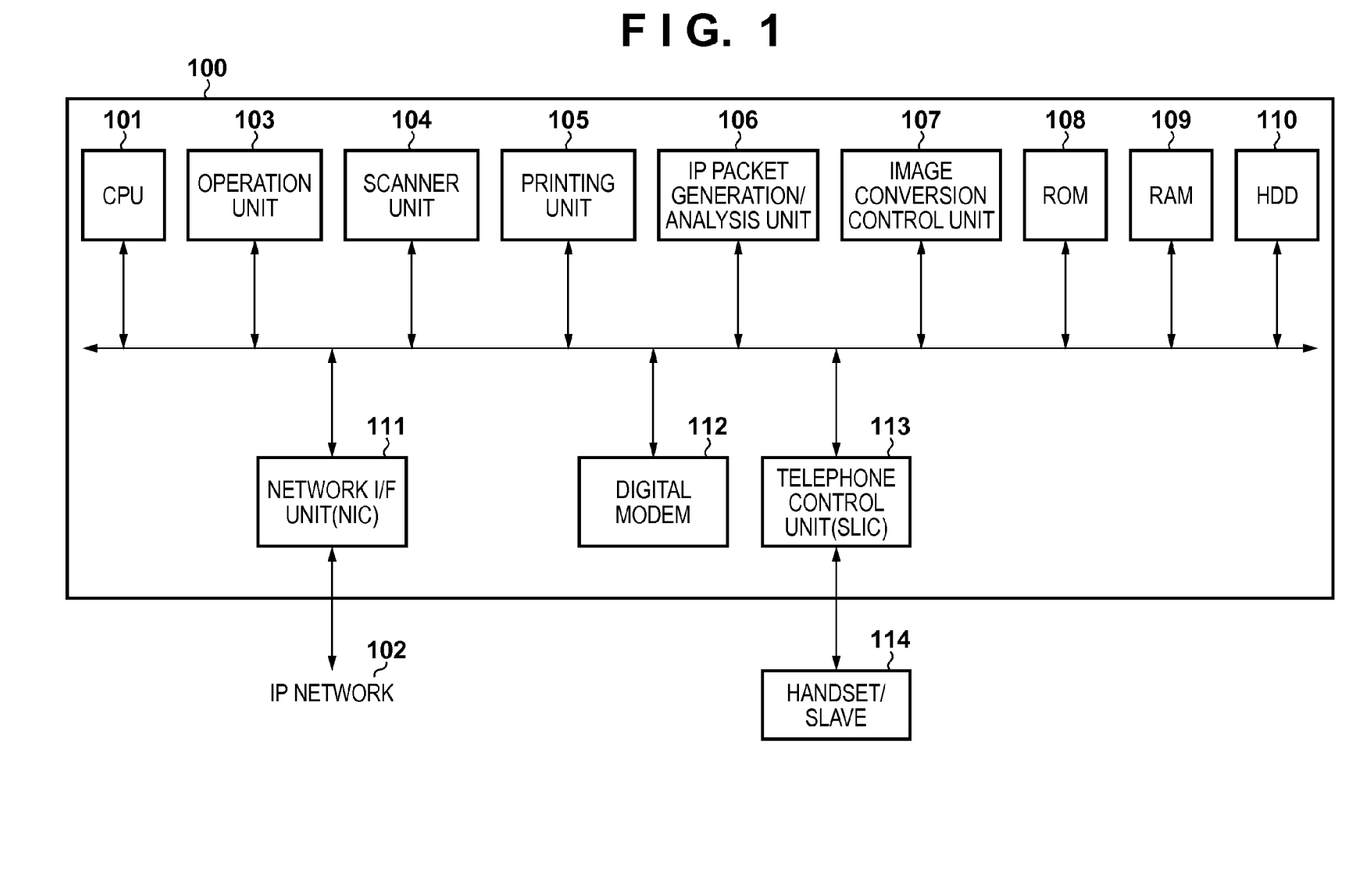
FIG. 1 is a block diagram showing the block arrangement of an image communicating apparatus.

FIG. 1 is a block diagram for explaining the arrangement of an image communicating apparatus 100 according to an embodiment of the present invention.

A CPU 101 controls each device of the image communicating apparatus 100 according to a control program stored in a ROM 108 or an HDD (Hard Disk Drive) 110. An IP network 102 is an intranet, a public IP network, or the like. An operation unit 103 includes a display unit and a key operation unit. The display screen of the display unit displays, for example, windows, icons, messages, menus, and other user interface information. Although not shown, the operation unit 103 includes various keys used by the user to perform copy, FAX, and printer operations, and a pointing device used to operate the icons, menus, and the like on the display screen of the display unit. Note that the display unit may have a touch panel function. A scanner unit 104 reads a document, and outputs image data corresponding to an image of the document. A printing unit 105 performs printing according to print data saved in a RAM 109 or the HDD 110. The ROM 108 holds data and various control programs to be executed by the CPU 101. The RAM 109 provides a work area for the CPU 101, an area for saving data at the time of error processing, an area for loading control programs, and the like. The HDD 110 is used to save various control programs and print data.

An IP packet generation/analysis unit 106 maps the ITU-T recommendation T.38 protocol to an IP packet, and extracts the ITU-T recommendation T.30/T.38 protocol from the received IP packet. An image conversion control unit 107 performs compression/decompression, scaling, and linear density conversion for image data to undergo FAX communication. This embodiment relates to a deemed voice communication (a deemed voice) and a detailed description of T.38 will be omitted. A network interface (NIC) 111 controls connection to the IP network 102. A digital modem 112 modulates/demodulates a FAX signal. A SLIC (telephone control unit) 113 implements a telephone function of encoding/decoding a voice signal, includes an A/D conversion unit, D/D conversion unit, and voice codec for encoding or decoding a voice signal into a G.711 or G.729 signal, and is connected to a handset/slave 114. The digital modem 112 includes a PCM I/F and AT command I/F. The AT command I/F transmits a control instruction by an AT command to the digital modem 112. The AT command I/F sends image data to the digital modem 112 at the time of FAX transmission, and receives image data from the digital modem 112 at the time of FAX reception (facsimile reception). The PCM I/F is used to input/output digital voice data.

The SLIC 113 includes a PCM I/F and SLIC control I/F. The SLIC control I/F is used to control the SLIC 113. The PCM I/F is used to input/output digital voice data. When a program stored in the RAM 109 or the HDD 110 is loaded into the RAM 109 and the CPU 101 executes the program, CNG signal detection processing by software is performed. For example, if FAX transmission using a deemed voice is performed via the IP network 102, image data obtained by the scanner unit 104 is stored in the RAM 109, and converted by the image conversion control unit 107. The image data is demodulated by the digital modem 112, formed into an IP packet by the IP packet generation/analysis unit 106, and then sent to the IP network 102 via the NIC 111.

Figure 2:
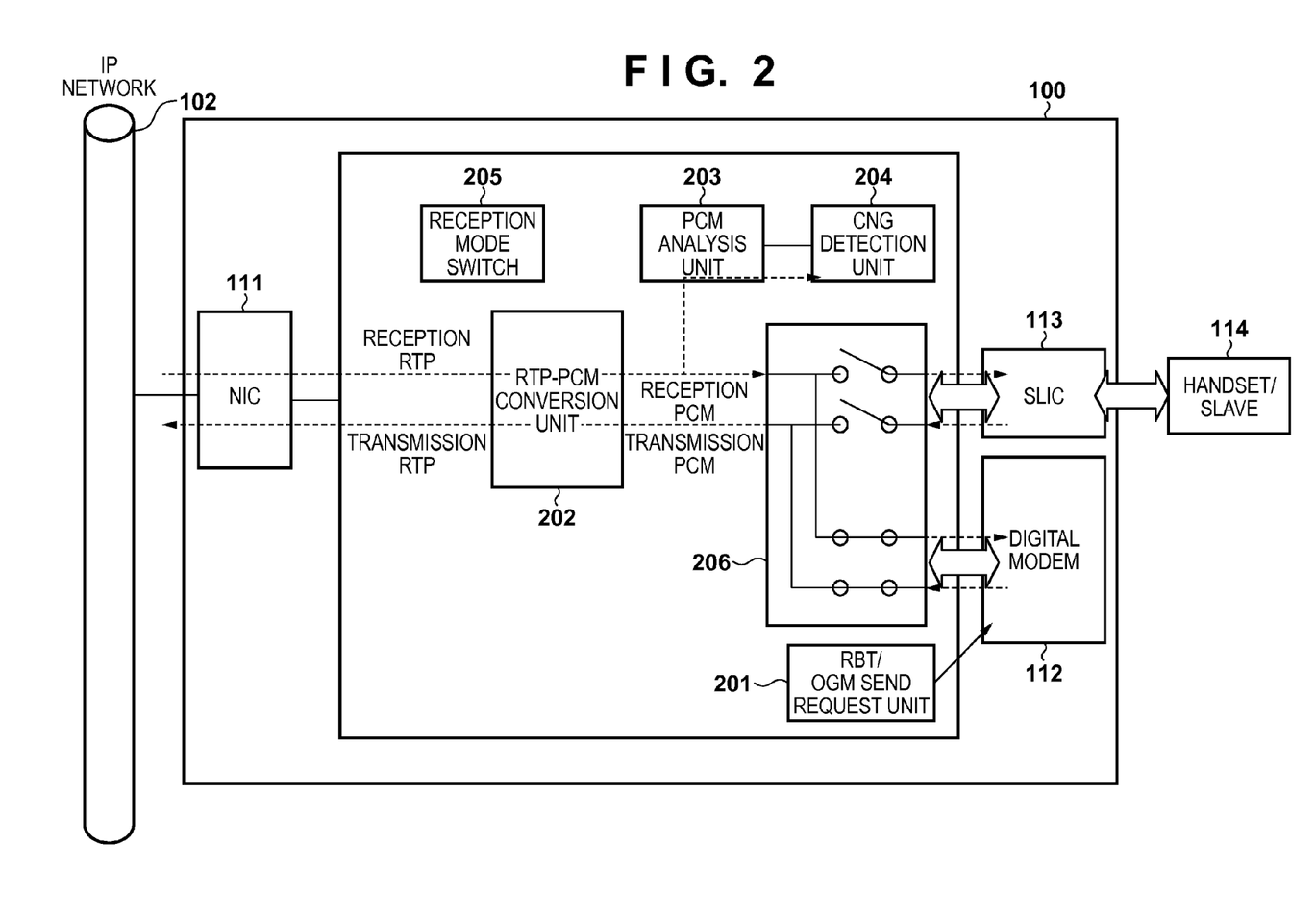
FIG. 2 is a block diagram showing the functional block arrangement of an image communicating apparatus.

FIG. 2 is a functional block diagram for explaining the function of the image communicating apparatus 100 according to the embodiment. Note that the same reference numerals as in FIG. 1 denote the common parts in FIG. 2.

An RBT/OGM send request unit 201 requests, via the AT command I/F, the digital modem 112 to output a pseudo RBT signal or OGM signal. An RTP-PCM conversion unit 202 performs processing of extracting a PCM voice from an RTP protocol received from the network I/F, and converting a PCM voice output from the digital modem 112 or SLIC 113 into an RTP protocol. A PCM analysis unit 203 analyzes the PCM voice, and performs frequency analysis by fast Fourier transform or the like. A CNG detection unit 204 searches for a CNG signal (a 1100-Hz tone signal) from a frequency analysis result obtained by the PCM analysis unit 203. The CNG detection unit 204 corresponds to CNG signal detection processing by software.

Since PCM analysis imposes a load on the CPU, no CNG signal detection processing by software is performed during a silence period in which the digital modem 112 sends no pseudo RBT signal or OGM signal, and the digital modem 112 detects a CNG signal, thereby minimizing the load of the CPU.

A reception mode switch 205 is a software switch capable of switching the reception mode of the IP FAX to an automatic reception mode, a FAX/TEL switching mode, a message recording/TEL switching mode, or the like, and designating it, and can be set by the operation unit 103 or the like. In the automatic reception mode or message recording/TEL mode, the digital modem 112 sends no pseudo RBT signal or OGM signal, and a CNG signal is detected not by software but by the digital modem 112 as the conventional technique.

In response to an instruction of the CPU 101, a selector 206 switches connection between the SLIC 113 and the line. PCM data output from the digital modem 112 via the selector 206 is formed into an RTP packet by the RTP-PCM conversion unit 202, and transmitted to the IP network 102. An RTP packet received from the IP network 102 is converted into PCM data, and input to the digital modem 112. On the other hand, if the SLIC 113 is connected via the selector 206, PCM data output from the SLIC 113 is formed into an RTP packet by the RTP-PCM conversion unit 202, and transmitted to the IP network 102. An RTP packet received from the IP network 102 is converted into PCM data, and input to the SLIC 113.

The sequence of the FAX/TEL switching mode will be described next.

A transmitter transmits an INVITE signal of the SIP protocol to a receiver. If the medium type of the INVITE signal is "audio" (voice), the receiver returns a 200 OK signal to the transmitter as a response. A session is established between the transmitter and the receiver according to the medium type (audio). At this time, FAX communication has not started. After that, the RBT/OGM send request unit 201 requests the digital modem 112 to output an OGM signal. In response to this, the digital modem 112 outputs a PCM voice of an OGM signal from the PCM I/F. Upon completion of output of the OGM signal, a PCM voice of a pseudo RBT signal is output.

If the transmitter is a FAX, it sends a CNG signal contained in an RTP packet at the same time. While sending an OGM signal or pseudo RBT signal, the digital modem 112 cannot detect a CNG signal sent from the transmitter. Therefore, the RTP-PCM conversion unit 202 converts an RTP packet sent from the transmitter into a PCM signal, the PCM analysis unit 203 analyzes the PCM signal, and the CNG detection unit 204 detects a CNG signal.

If no CNG signal is detected for a given time, the partner apparatus is probably a telephone, and thus a handset calling request is issued to the SLIC 113. If a CNG signal is detected, a handset calling request to the SLIC 113 is interrupted, thereby advancing to a FAX reception procedure.

In the message recording/TEL switching mode, after a session for the media type "audio" is established, the handset/slave 114 connected to the SLIC 113 terminates a call. The handset/slave 114 plays back a message recording device response message, and a PCM signal sent via the PCM I/F of the SLIC 113 is converted into an RTP packet by the RTP-PCM conversion unit 202, and sent to the IP network 102. At this time, the digital modem 112 sends no pseudo RBT signal or OGM signal, and can thus detect a CNG signal sent from the transmitter. If the digital modem 112 detects a CNG signal while the image communicating apparatus 100 sends a message recording device response message, the connections to the SLIC 113 and the handset/slave 114 are disconnected, thereby advancing to a FAX reception procedure.

Figure 3:
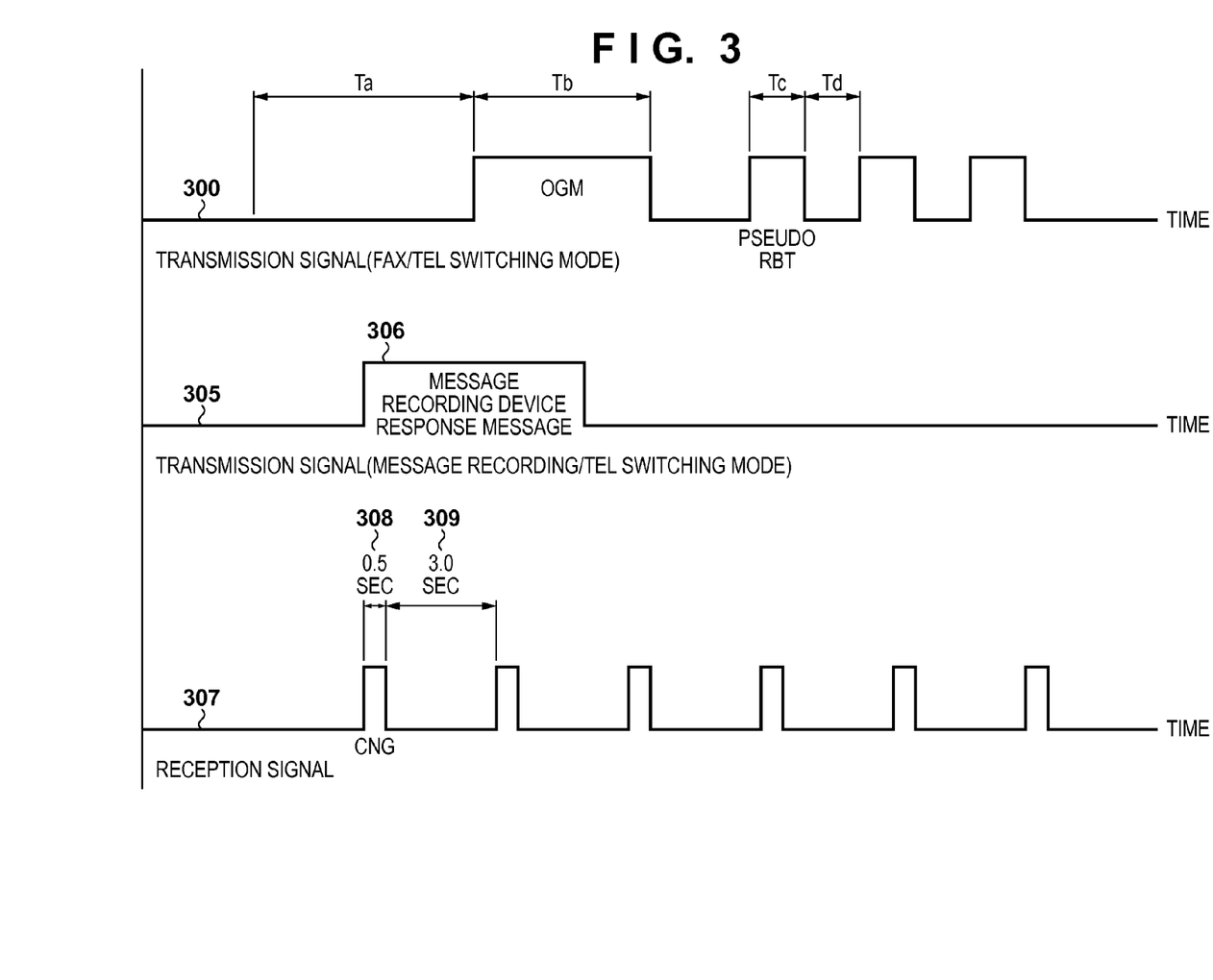
FIG. 3 is a timing chart showing a transmission signal and a PCM reception signal in each mode of the image communicating apparatus.

FIG. 3 is a timing chart for explaining a transmission signal and a PCM reception signal in each mode of the image communicating apparatus according to the embodiment. Referring to FIG. 3, the abscissa represents the time and the ordinate represents input/output processing.

A PCM signal 300 is transmitted in the FAX/TEL switching mode. Reference symbol Ta denotes a silence period; Tb, an OGM sending period; Tc, a pseudo RBT sending period; and Td, a pseudo RBT silence period. The pseudo RBT sending period Tc and the pseudo RBT silence period Td are alternately repeated. The pseudo RBT sending period Tc and the pseudo RBT silence period Td change for each country. As representative examples, Tc is 1 sec and Td is 2 sec in Japan, and Tc is 2 sec and Td is 4 sec in the U.S.A.

A PCM signal 305 is transmitted in the message recording/TEL switching mode. Reference numeral 306 denotes a message recording device response message. The message recording device response message 306 is sent not by the digital modem 112 but by the handset/slave 114 connected to the SLIC 113.

Reference numeral 307 denotes a PCM signal to be received; 308, a CNG signal period; and 309, a CNG signal silence period. The CNG signal period 308 and the silence period 309 are alternately repeated.

In the conventional FAX/TEL switching mode, the silence period Ta of about 4 sec is provided instead of sending an OGM signal immediately after a call is terminated, and an attempt is made to detect a CNG signal during the silence period Ta. Since the CNG signal period 308 is 0.5 sec and the CNG signal silence period 309 is 3 sec, a CNG signal can be detected once or twice during the silence period of 4 sec according to calculation. If no CNG signal can be detected during the silence period Ta due to, for example, a delay in sending of a CNG signal on the transmitter side, an attempt is made to detect a CNG signal during the succeeding pseudo RBT silence period Td. If, however, the message recording device response message 306 cannot be received during the pseudo RBT silence period Td, it is impossible to detect a CNG signal, and it is conventionally impossible to detect a CNG signal at an accuracy of 100%. If it is impossible to detect a CNG signal, a time until the next CNG signal period Tc during which the transmitter sends a CNG signal is 3 sec or more. During this time, ringing of the handset/slave 114 unwantedly starts. If the user off-hooks the telephone in response to this, voice communication starts, thereby disabling FAX reception.

Since the digital modem 112 cannot detect a CNG signal during the OGM sending period Tb in which the digital modem 112 sends an OGM signal, the silence period Ta is necessary. In this embodiment, since a CNG signal can be detected by software during the OGM sending period Tb, the silence period Ta becomes unnecessary. Since the silence period Ta is a silence period during which neither FAX communication nor voice communication is performed, the user may become suspicious to disconnect a call. This embodiment improves this problem. In this embodiment, a CNG signal received during the pseudo RBT sending period Tc can also be detected.

In the FAX automatic reception mode, since the process immediately transits to a FAX procedure without outputting an OGM signal or pseudo RBT signal, it is not necessary to perform CNG signal detection processing by software.

In the message recording/TEL switching mode, the digital modem 112 sends no OGM signal or pseudo RBT signal, and can continuously wait for a CNG signal from a partner.

Consequently, if a result of acquiring the value of the reception mode switch 205 indicates that the reception mode is the FAX automatic reception mode or message recording/TEL switching mode, only CNG signal detection processing by the digital modem 112 is performed without performing CNG signal detection processing by software. This can suppress the load of the CPU 101, which is imposed by detection of a CNG signal by software.

FIGS. 4A to 6 are flowcharts for explaining the processing of the image communicating apparatus 100 according to this embodiment. Note that a program for executing this processing is stored in the ROM 108 or HDD 110, loaded into the RAM 109 at the time of execution, and executed under the control of the CPU 101.

Figure 4A:
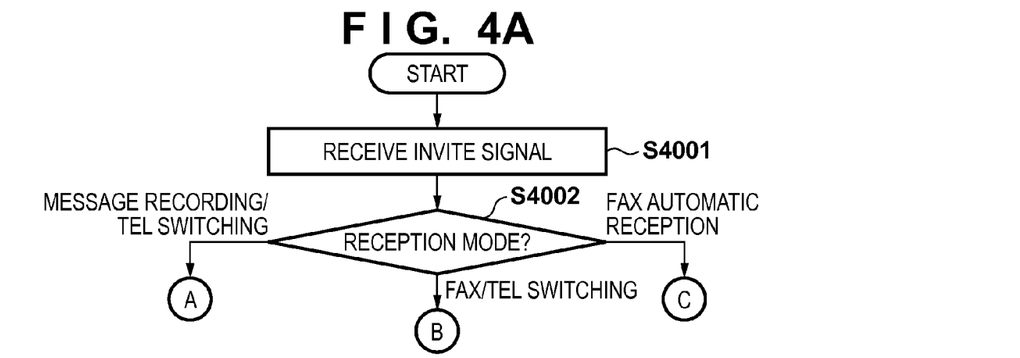
FIGS. 4A and 4B are flowcharts illustrating the processing procedure of the image communicating apparatus.

In step S4001 of FIG. 4A, the CPU 101 receives a SIP INVITE signal. The media type of the INVITE signal is "audio" (voice). At this time, therefore, it is impossible to discriminate between voice communication and deemed voice IP FAX communication. Medium communication is performed by returning a 200 OK signal in response to the INVITE signal. SIP is a well-known technique and a description thereof will be omitted. The process advances to step S4002, and the CPU 101 determines, by the reception mode switch 205, whether the reception mode is the FAX automatic reception mode, message recording/TEL switching mode, or the FAX/TEL switching mode. The process transits to one of different processes in accordance with the determination result. If the reception mode is the FAX automatic reception mode, the process advances to step S4028 of FIG. 6 to perform FAX communication. If the reception mode is the message recording/TEL switching mode, the process advances to step S4003 of FIG. 4B. If the reception mode is the FAX/TEL switching mode, the process advances to step S4011 of FIGS. 5A and 5B.

A case in which the reception mode is the message recording/TEL switching mode will be described first. In this mode, the digital modem 112 sends no OGM signal or pseudo RBT signal, and can thus detect a CNG signal. In step S4003 of FIG. 4B, the SLIC 113 is connected via the selector 206, and sends a pseudo CI signal to the handset/slave 114 to call the handset/slave 114. The process advances to step S4004, and the handset/slave 114 terminates the call upon receiving the pseudo CI signal. The process advances to step S4005 in which the handset/slave 114 plays back a message recording device response message and the SLIC 113 sends the message as a PCM signal. The PCM signal is converted into an RTP protocol by the RTP-PCM conversion unit 202, and then transmitted to the transmitter via the IP network 102. Note that the processes in steps S4003 to S4005 are executed by the SLIC 113 and handset/slave 114.

Figure 4B:
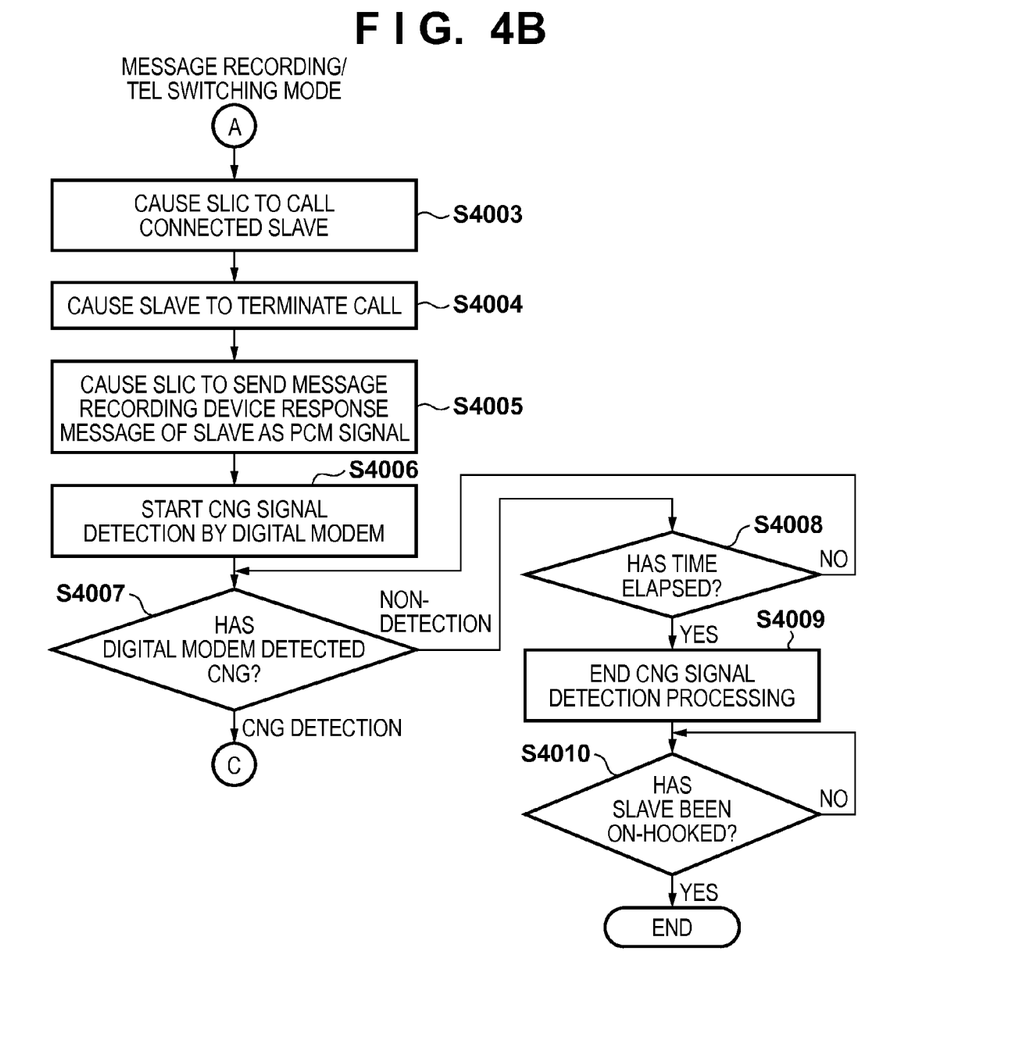

Simultaneously with this, CNG signal detection processing by the digital modem 112 is performed in step S4006, and the CPU 101 determines in step S4007 whether the digital modem 112 has detected a CNG signal. If it is determined that a CNG signal has been detected, the selector 206 disconnects the connection to the SLIC 113, and the process advances to FAX reception processing in step S4028 of FIG. 6; otherwise, the process advances to step S4008. In step S4008, the CPU 101 determines whether a CNG signal detection time has exceeded a predetermined time and thus a time-out has occurred. If it is determined that no time-out has occurred, the process returns to step S4007 to continue the CNG signal detection processing by the digital modem 112. If it is determined in step S4008 that a time-out of the CNG signal detection time has occurred, the process advances to step S4009, and the CPU 101 ends the CNG signal detection processing. The process then advances to step S4010. If the handset/slave 114 has been on-hooked, the CPU 101 disconnects the call; otherwise, the processing in step S4010 is repeated to wait for on-hooking of the handset/slave 114 or disconnection of the call by a calling party.

Figure 5A:
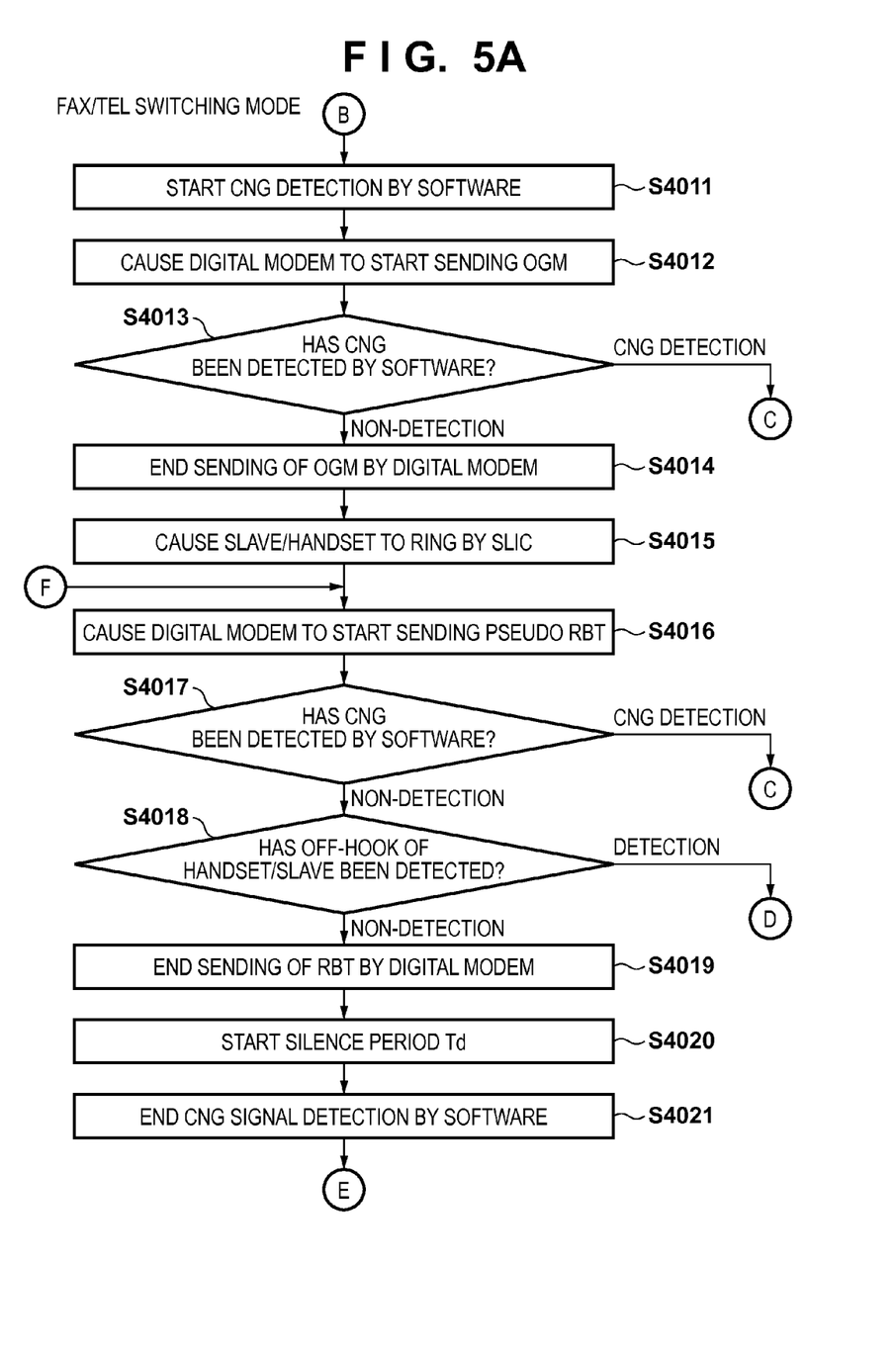
FIGS. 5A and 5B are flowcharts illustrating the processing procedure of the image communicating apparatus.
Figure 5B:
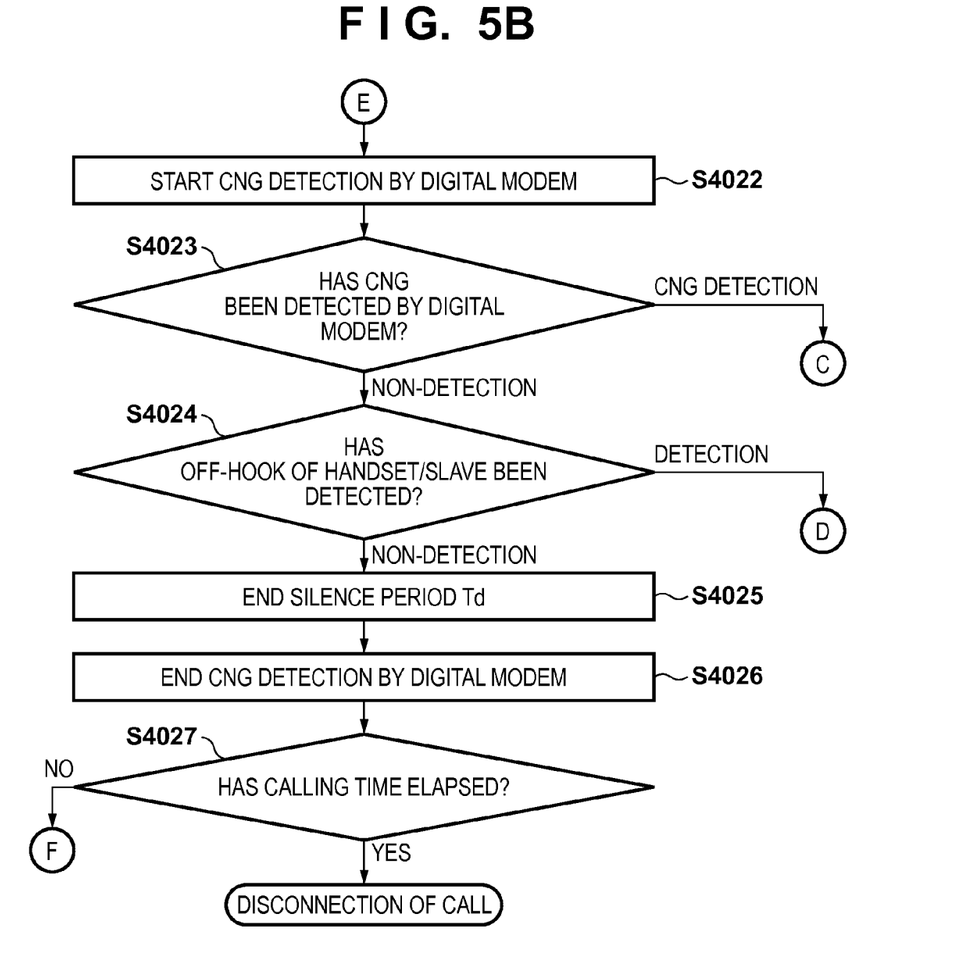

On the other hand, if it is determined in step S4002 that the reception mode is the FAX/TEL switching mode, the process advances to step S4011 of FIGS. 5A and 5B. While the CPU 101 attempts to detect a CNG signal by software in step S4011, the digital modem 112 starts to send an OGM signal in step S4012. If the CPU 101 determines in step S4013 that a CNG signal has been detected, the process advances to step S4028 of FIG. 6 to perform FAX reception processing; otherwise, the process advances to step S4014.

In step S4014, the CPU 101 ends sending of the OGM signal by the digital modem 112. The process then advances to step S4015, and the CPU 101 controls the SLIC 113 by connecting it via the selector 206, thereby causing the handset/slave 114 to ring using a pseudo CI signal. Assume that the handset/slave 114 is caused to ring after the end of sending of the OGM signal in step S4014 or when a given time (for example, 3 sec) elapses after the start of the CNG signal detection processing in step S4011.

In step S4016, the CPU 101 causes the digital modem 112 to start sending a pseudo RBT signal. In step S4019, the CPU 101 continues the CNG signal detection processing by software until sending of the pseudo RBT signal by the digital modem 112 is completed. If, during this time, the CPU 101 determines in step S4017 that a CNG signal has been detected, the process advances to the FAX reception processing in step S4028 of FIG. 6. If it is determined in step S4018 that the off-hook of the handset/slave 114 has been detected, the process advances to voice communication processing in step S4029 of FIG. 6.

If non-detection is determined in step S4017 or step S4018, the process advances to step S4019 to end sending of the OGM signal or pseudo RBT signal by the digital modem 112. When the process advances to step S4020 to start the silence period Td, the process advances to step S4021, and the CPU 101 ends the CNG signal detection processing by software. In step S4022, the CPU 101 switches to CNG signal detection processing by the digital modem 112. If it is determined in step S4023 that the digital modem 112 has detected a CNG signal before the silence period Td ends, the process advances to step S4028 of FIG. 6; otherwise, the process advances to step S4024. If the CPU 101 determines in step S4024 that the handset/slave 114 connected to the SLIC 113 has been off-hooked, the process advances to step S4029 of FIG. 6 to start voice communication.

Figure 6:
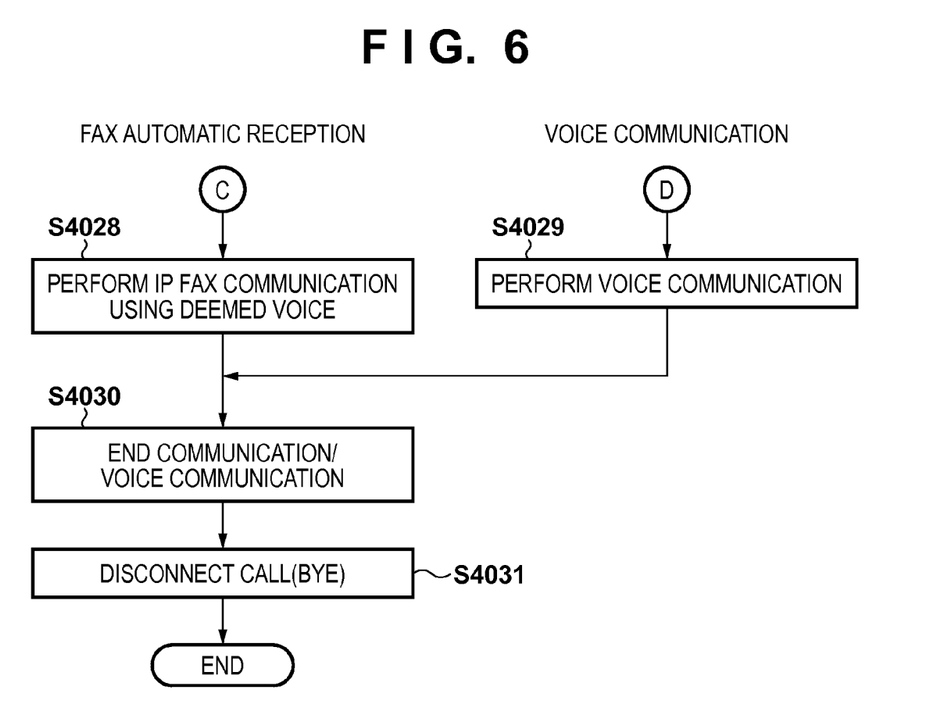
FIG. 6 is a flowchart illustrating the processing procedure of the image communicating apparatus.

If the CPU 101 determined in step S4024 that the handset/slave 114 has not been off-hooked, the silence period Td ends in step S4025. In step S4026, the CPU 101 ends the CNG signal detection processing by the digital modem 112, and the process advances to step S4027. If the CPU 101 determines in step S4027 that no time-out of a calling time has occurred, the process returns to step S4016 to repeat the process from sending of the pseudo RBT signal by the digital modem 112. If the CPU 101 determines in step S4027 that a time-out has occurred, the call is disconnected and the process ends. Note that if a partner disconnects a call, communication ends throughout the sequence.

In step S4028 of FIG. 6, IP FAX communication is performed using a deemed voice. In step S4029, voice communication is performed using the SLIC 113 and handset/slave 114. Upon completion of communication/voice communication in step S4030, the CPU 101 disconnects the call (BYE according to the SIP protocol) in step S4031, thereby completing communication/voice communication. Note that a description of IP FAX communication using a deemed voice will be omitted.

As described above, according to this embodiment, if the digital modem 112 cannot detect a CNG signal since it sends an OGM signal or pseudo RBT signal, a CNG signal is detected by software. If the digital modem completes sending of an OGM signal or pseudo RBT signal, and can thus perform CNG signal detection processing, the CNG signal detection processing by the software ends and CNG signal detection processing by the digital modem 112 is performed. This can reduce the load of the CPU, which is imposed by the CNG signal detection processing by the software, thereby making it possible to detect a CNG signal in any case.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-041940, filed Mar. 4, 2014, which is hereby incorporated by reference herein in its entirety.

What is claimed is:

1. An image communicating apparatus capable of performing a deemed voice communication, comprising:
    a modem configured to perform FAX communication by the deemed voice communication;
    a detection unit configured to detect a FAX reception instead of the modem by analyzing data of the deemed voice communication received via an IP network; and
    a control unit configured to control the detection unit on whether to detect the FAX reception based on the FAX communication which is being performed by the modem,
    wherein the control unit controls the detection unit to detect the FAX reception in a case where the modem is sending a FAX signal in the FAX communication by the deemed voice communication, and
    the control unit controls the detection unit not to detect the FAX reception in a case where the modem is not sending the FAX signal in the FAX communication by the deemed voice communication.

2. The apparatus according to claim 1, wherein the detection unit detects the FAX reception by a CNG signal.

3. The apparatus according to claim 1, wherein a period in which the modem cannot detect the FAX reception is a period in which the modem outputs one of an OGM signal and RBT signal as the FAX signal.

4. The apparatus according to claim 3, wherein in a case where the detection unit detects the FAX reception, the control unit does not provide a silence period before the period in which the modem cannot detect the FAX reception.

5. The apparatus according to claim 1, further comprising a designation unit configured to designate one of a FAX automatic reception mode, a message recording/TEL switching mode, and a FAX/TEL switching mode,
    wherein in a case where the designation unit designates the FAX/TEL switching mode, the control unit controls the detection unit on whether to detect the FAX reception based on the FAX communication which is being performed by the modem.

6. The apparatus according to claim 1, further comprising a designation unit configured to designate one of a FAX automatic reception mode, a message recording/TEL switching mode, and a FAX/TEL switching mode,
    wherein in a case where the designation unit designates the message recording/TEL switching mode, the control unit controls the modem to detect the FAX reception.

7. The apparatus according to claim 6, wherein in a case where the designation unit designates the message recording/TEL switching mode, a telephone connected to the image communicating apparatus transmits a message recording device response message.

8. The apparatus according to claim 5, wherein in a case where the designation unit designates the FAX/TEL switching mode and the silence period is provided, the modem detects the FAX reception during the silence period after a period in which an RBT signal is output.

9. The apparatus according to claim 1, wherein in a case where one of the detection unit and the modem detects the FAX reception, the modem performs the FAX communication by the deemed voice communication.

10. A control method for an image communicating apparatus which is capable of performing a deemed voice communication, and includes a modem configured to perform FAX communication by the deemed voice communication, the method comprising:
    a detection step to detect a FAX reception instead of the modem by analyzing data of the deemed voice communication received via an IP network; and
    a control step of controlling the detection step on whether to detect the FAX reception based on the FAX communication which is being performed by the modem,
    wherein the control step controls the detection step to detect the FAX reception in a case where the modem is sending a FAX signal in the FAX communication by the deemed voice communication, and
    the control step controls the detection step not to detect the FAX reception in a case where the modem is not sending the FAX signal in the FAX communication by the deemed voice communication.

11. A non-transitory computer-readable storage medium storing a program for causing a computer to execute each step of a control method for an image communicating apparatus capable of performing a deemed voice communication, the image communicating apparatus including a modem configured to perform FAX communication by the deemed voice communication, the method comprising:
    a detection step to detect a FAX reception instead of the modem by analyzing data of the deemed voice communication received via an IP network; and controlling the detection step on whether to detect the FAX reception based on the FAX communication which is being performed by the modem, wherein the control step controls the detection step to detect the FAX reception in a case where the modem is sending a FAX signal in the FAX communication by the deemed voice communication, and the control step controls the detection step not to detect the FAX reception in a case where the modem is not sending the FAX signal in the FAX communication by the deemed voice communication.

12. The apparatus according to claim 1, the control unit controls the modem to detect the FAX reception in a case where the modem is not sending the FAX signal in the FAX communication by the deemed voice communication.

13. The apparatus according to claim 1, wherein the detection unit analyzes the data by PCM (Pulse Code Modulation).

14. The apparatus according to claim 1, wherein the modem includes a PCM interface for digitalized voice data.

15. The apparatus according to claim 1, wherein the modem performs the FAX communication via the IP network by the deemed voice communication.

* * * * *